United States Patent [19]
Fujii et al.

[11] 3,933,697
[45] Jan. 20, 1976

[54] METHOD FOR PREPARING A POLYURETHANE FOAM COMPRISING QUATERNARY AMMONIUM SALT AS ANTISTATIC AGENT

[75] Inventors: Osamu Fujii, Kounosu; Toshio Kishimoto, Kawagoe; Hisao Kosuge, Kawagoe; Ryoji Nagamine, Kawagoe; Sumio Shimada, Kawagoe, all of Japan

[73] Assignee: Toyo Rubber Chemical Industrial Corporation, Tokyo, Japan

[22] Filed: July 30, 1974

[21] Appl. No.: 493,056

[30] Foreign Application Priority Data
July 31, 1973 Japan.............................. 48-86143

[52] U.S. Cl.... 260/2.5 A; 260/2.5 AC; 260/2.5 AM; 260/2.5 AQ; 260/DIG. 20; 260/DIG. 21
[51] Int. Cl.².... C08G 18/14; C08J 9/00; C08J 9/40
[58] Field of Search... 260/2.5 AC, 2.5 AW, 2.5 BF, 260/2.5 A, 2.5 BD, DIG. 20, DIG. 21, 2.5 AM, 2.5 AQ

[56] References Cited
UNITED STATES PATENTS

| | | | |
|---|---|---|---|
| 2,579,375 | 12/1951 | Eisen ........................... | 260/DIG. 20 |
| 2,950,262 | 8/1960 | Bush et al. .................... | 260/2.5 AC |
| 3,010,963 | 11/1961 | Erner ............................ | 260/2.5 AC |
| 3,235,446 | 2/1966 | Shelanski et al................ | 260/2.5 A |
| 3,471,423 | 10/1969 | Elmer et al..................... | 260/2.5 AC |
| 3,479,310 | 11/1969 | Dieterich et al................ | 260/2.5 A |
| 3,546,233 | 12/1970 | Szmuszkovicz................ | 260/2.5 AC |

FOREIGN PATENTS OR APPLICATIONS

| | | | |
|---|---|---|---|
| 25,049 | 4/1962 | Japan.............................. | 260/2.5 A |
| 634,628 | 1/1962 | Canada .......................... | 260/2.5 AC |

*Primary Examiner*—H. S. Cockeram
*Attorney, Agent, or Firm*—Kemon, Palmer & Estabrook

[57] ABSTRACT

An antistatic polyurethane foam contains quaternary ammonium salt as an antistatic agent. The quaternary ammonium salt is added either to a raw material for polyurethane foam or to a prepared polyurethane foam by causing the foam to be impregnated with a solution containing the quaternary ammonium salt and drying it.

5 Claims, 1 Drawing Figure

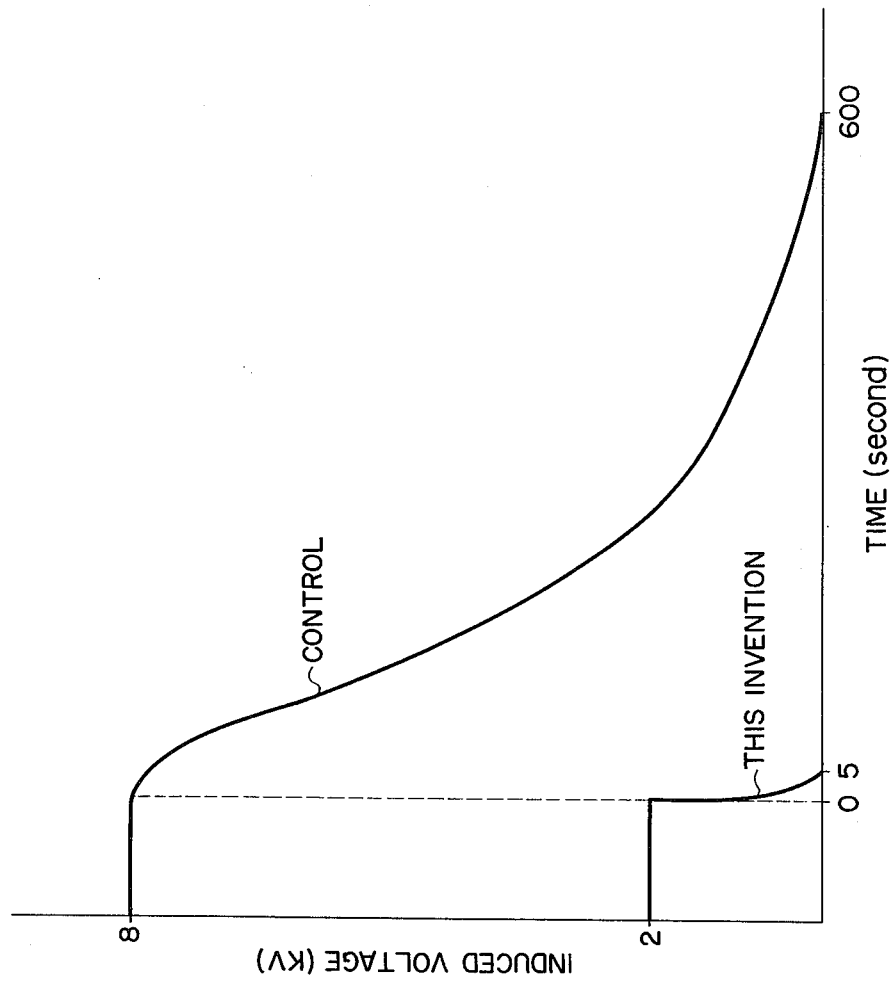

METHOD FOR PREPARING A POLYURETHANE FOAM COMPRISING QUATERNARY AMMONIUM SALT AS ANTISTATIC AGENT

This invention relates to an antistatic polyurethane foam and a method for preparing the same.

Urethane foam is prominently electrified when friction is imparted thereto. In a mattress manufacturing factory, when urethane foam is sliced into sheets, operator's working clothes are subjected to static electricity, giving off intense sparks. This leads to reduced operability and, in a worst case, a fire hazard.

Urethane form is widely used, for example, for mattress and for the trimming of an automobile etc. and interior decoration. However, there arises a problem as presented by static electricity. During the use of urethane foam, charges of static electricity is stored in the associated metal parts or metal fittings. This phenomenon shows a marked increase particularly in dry season and, when the metal part or metal fittings are touched by the finger of the operator, an unpleasant electric shock is imparted to the operator due to charges of static electricity. Particularly where a driver is occupied on the seat of an automobile, there is a chance that the drive suddenly suffers such an electric shock, thus disturbing the driver's attention.

When urethane foam is sliced into sheets, the operator experiences static electricity as already mentioned above. Since static electricity is stored by friction, the operator suffers an intense electric shock when he touches the associated metal etc., leading to reduced operability and in a worst case an injure to the human body. It comes to such a stage that such discomforts experienced due to charges of static electricity can not be overlooked merely as daily occurrences. In spite of this fact, no effective step is taken to this date to prevent occurrence of such static electricity.

It is accordingly a primary object of this invention to provide polyurethane foam having an excellent antistatic property.

Another object of this invention is to provide a method for preparing an antistatic polyurethane foam without losing rebound property etc.

An antistatic polyurethane foam according to this invention contains quaternary ammonium salt as an antistatic agent. The quaternary ammonium salt may be added during the reaction of polyols with polyisocyanates. In this case it is preferred that 0.05 to 10 parts by weight of quaternary ammonium salt be added based on 100 parts by weight of polyols. Where less than 0.05 part by weight of quaternary ammonium salt is added, an insufficient antistatic effect is exhibited. In contrast, where the amount of quaternary ammonium salt exceeds 10 parts by weight, it is difficult to form an excellent polyurethane foam due to irregular cells and shrinkage.

Quaternary ammonium salt may be added to a prepared polyurethane foam by causing the foam to be impregnated with a solution containing the quaternary ammonium salt and drying it. In this case, the solution is prepared by dissolving, or dispersing, quaternary ammonium salt into water, alcohol or polychloroprene latex. Where quaternary ammonium salt is added to polyurethane foam in a form dissolved or dispersed into a solution, it is preferred that quaternary ammonium salt be added thereto in an amount of 0.05 parts by weight or more based on 100 parts by weight or more based on 100 parts by weight of polyols. Where the amount of quaternary ammonium salt does not reach this value, an insufficient antistatic effect is exhibited. In this case, addition of more than 10 parts by weight of quaternary ammonium salt exerts no bad influence on the structure of polyurethane foam per se. It is preferred, however, that the maximum amount of quaternary ammonium salt be 50 parts by weight from the economical view point as well as due to the properties of matter such as rebound property etc. being degraded.

Quaternary ammonium salt used in this invention as an antistatic agent is represented by a general formula:
R₄NX
in which R stands for alkyl group or aryl group and X stands for halogen or acid radical.

For example, the following quaternary ammonium salts may be preferably used.

$[C_{12}H_{25}N(CH_3)_3]ClO_4$;
$[C_{12}H_{25}N(CH_3)_2C_2H_4OH]ClO_4$;
$[C_{12}H_{25}N(CH_3)_2C_2H_4OH]Br$;

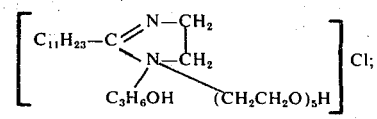

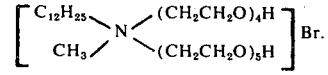

$$\left[ \begin{array}{c} C_{11}H_{23}-C \underset{N-CH_2}{\overset{N-CH_2}{\diagup}} \\ C_3H_6OH \quad (CH_2CH_2O)_5H \end{array} \right] Cl;$$

$[C_{16}H_{33}-\underset{CH_3}{\overset{CH_3}{\underset{|}{N}}}-CH_2-C_6H_5]Cl$;

$[C_{12}H_{25}-\underset{CH_3}{\overset{CH_3}{\underset{|}{N}}}-CH_3]Cl$;

$[C_{12}H_{25}-\underset{CH_3}{\overset{CH_3}{\underset{|}{N}}}-(CH_2CH_2O)_4H]Cl$; and $\left[ \begin{array}{c} C_{12}H_{25} \diagdown \quad \diagup (CH_2CH_2O)_4H \\ \quad\quad N \\ CH_3 \diagup \quad \diagdown (CH_2CH_2O)_5H \end{array} \right] Br.$ These quaternary ammonium salts exhibit a reliable antistatic effect in a small amount without degrading the properties of matter of polyurethane foam.

The FIGURE represents an attenuation curve of static electricity showing a comparison between polyurethane foam according to this invention and a conventional polyurethane foam prepared without using quaternary ammonium salts.

This invention adopts the conventional method for preparing polyurethane foam except that quaternary ammonium salts are used as an antistatic agent. Generally, polyurethane foam is prepared in one-shot process or prepolymer process by suitably mixing polyols and polyisocyanates both constituting essential constituents with a sub-agent such as a blowing agent, catalyst, foam stabilizer, pigment, extender etc. As the polyols, polyester polyols and polyether polyols such as polypropylene glycol, polyethylene glycol etc. are widely used. As the polyisocyanates, tolylene diisocyanates (TDI) and diphenylmethane-4,4'-diisociate (MDI) are widely used. According to one method of this invention quaternary ammonium salts are added into a raw material for polyurethane foam without involving any loss. During the above-mentioned reaction process it was found that the quaternary ammonium salt also performs the function for promoting gelation i.e. serves as a polymerization catalyst. Consequently, it is possible to reduce an amount of expensive tin catalyst such as stannous octoate. Where a lesser amount of tin catalyst is used, many open cells are produced, resulting in an increase in breathability, cushioning property, extensibility and rebound property. A comparison was made, for example, in breathability between polyurethane foam prepared by adding quaternary ammonium salts into raw material and conventional polyurethane foam prepared without using quaternary ammonium salts. In the former case, the breathability was found to be 150 to 170 cc/min/cm², while in the latter case the breathability was found to be 100 to 120 cc/min/cm². The polyurethane foam prepared according to this invention is, therefore, desirably used in applications, such as mattress, requiring a cushioning property.

According to another method of this invention quaternary ammonium salt is added to a prepared polyurethane foam through a solution containing said quaternary ammonium salt. In this case it is preferred to press the prepared polyurethane foam by a suitable means which is followed by expanding it to cause the solution containing the quaternary ammonium salt to be absorbed in the polyurethane foam, and dry the resultant foam after its excess portion is squeezed out.

This invention will be more fully understood from the following specific examples in which all parts are by weight.

EXAMPLE 1

| Component | Parts |
| --- | --- |
| trifunctional polyetherglycol (molecular weight 3000) | 100 |
| n-ethylmorpholine | 0.4 |
| triethylene diamine | 0.1 |
| stannous octoate | 0.2 |
| trichloromonofluoromethane | 2.0 |
| water | 5.0 |
| silicone oil | 1.5 |
| tolylene diisocyanate (isomer ratio 2,4/2,6=80/20) | 65.0 |
| New Elegan AI* | 0 to 5.0 |

*New Elegan AI is a trade name of quaternary ammonium salts manufactured by Japan Oils and Fats Co., Ltd., the chemical formula being represented as follows: [$C_{12}H_{25}N(CH_3)_3$] $ClO_4$.

A flexible polyurethane foam was manufactured according to the above-mentioned composition.

The specific gravity, rebound property and induced voltage of the foam were determined dependent upon the amount added of quaternary ammonium salt, the results of which are shown in Table I.

Vigorous frictions were imparted about 30 times to the surface of samples using a Bakelite plate and immediately thereafter the measurement of induced voltage was conducted using a static electricity measuring device (static voltmeter KTB-5 manufactured by KASUGA DENKI CO., LTD).

Table I

| | Amount added of New Elegan AI (parts) | | | | |
| --- | --- | --- | --- | --- | --- |
| | 0 | 0.1 | 0.5 | 2.5 | 5.0 |
| Specific gravity | 0.020 | 0.020 | 0.020 | 0.020 | 0.020 |
| Rebound property | 30 | 40 | 40 | 42 | 43 |
| Induced voltage | 7000–8000 | 200–250 | 0 | 0 | 0 |

Polyurethane foams were prepared substantially in the same procedure as mentioned above, except that use was made of Armostat 410 and Resistat 141 in place of quaternary ammonium salt. The foam articles all exhibited no antistatic effect, and phenomena such as irregular cells, cavities, "bottom-up" etc. were observed.

Armostat 410 is a trade name of a surface active agent manufactured by Lion Oils and Fats Co., Ltd., the chemical formula being represented by:

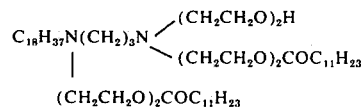

Resistat 141 is a trade name of a surface active agent manufactured by DAIICHI KOGYO MEDICINE MANUFACTURING CO., LTD., the chemical formula being represented by:

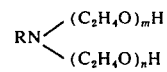

in which R denotes alkyl groups having carbon atoms of 7–12 and $m+n$ is an integer of 1–40.

Two kinds of samples were prepared substantially in the same procedure as mentioned above, one of which contains New Elegan AI of 0.5 part (this invention) and the other of which contains no New Elegan AI (conventional urethane foam). A voltage of 10KV was applied for 20 minutes to these samples to cause them to be electrified and the state in which the induced static electricity was decreased with time was observed. The detail is shown in a drawing. As will be appreciated from the drawing, urethane foam according to this invention showed an induced voltage of 2KV, the value of which came to a zero after lapse of 5 seconds, while the conventional urethane foam showed an induced voltage of 8KV, the value of which came to a zero after lapse of 600 seconds. The induced voltages shown in the drawing were measured using a static honestometer manufactured by Shishido & Co., Ltd.

EXAMPLE 2

The same procedure as in Example 1 was repeated except that four kinds of quaternary ammonium salts (a, b, c, and d) were used. 20 samples of flexible polyurethane foams were prepared. Vigorous frictions were imparted 30 times to the surface of the samples by the Bakelite plate and immediately thereafter voltages induced on the samples were measured using a static voltmeter KTB-5 manufactured by Kasuga Denki Co., Ltd. The result is shown in Table II.

Table II

|  | | Amount added of quaternary ammonium salt (parts) | | | |
|---|---|---|---|---|---|
|  | | 0 | 0.1 | 0.5 | 2.5 | 5.0 |
| Kinds of quaternary ammonium salts | a | 7000–8000 | 300–500 | 0 | 0 | 0 |
|  | b | ditto | 400–700 | 100–200 | 0 | 0 |
|  | c | ditto | 500–800 | 100–200 | 0 | 0 |
|  | d | ditto | 500–800 | 100–200 | 0 | 0 |

In Table II,
a: $[C_{12}H_{25}N(CH_3)_2C_2H_4OH]ClO_4$;

b: $[C_{12}H_{25}N(CH_3)_2C_2H_4OH]CH_3\text{-}\langle\text{C}_6\text{H}_4\rangle\text{-}SO_3$;

c: 
$$\left[\begin{array}{c}C_{11}H_{23}-C\diagup^{N-CH_2}_{N-CH_2}\diagdown\\C_3H_6OH\quad(CH_2CH_2O)_5H\end{array}\right]Cl;\text{ and}$$

d:
$$\left[\begin{array}{c}CH_3\\C_{16}H_{33}-N-CH_2-C_6H_5\\CH_3\end{array}\right]Cl.$$

EXAMPLE 3

Polyurethane foam having a specific gravity of 0.020 was sliced to a thickness of 5 mm to form lengthy sheets.

The lengthy sheets were passed through a 20% aqueous solution of lauryltrimethyl ammonium chloride and so adjusted in a suitable method as to contain 5% of said quaternary ammonium salt based on the weight of polyurethane foam. The so adjusted sheets were dried for 20 minutes in an oven at 90°C.

It was proved that the amount of lauryltrimethyl ammonium chloride held in the sheet was 2.78 parts based on 100 parts of polyols.

When measured based on the procedure of Example 1, an induced voltage of the resultant sheet was found to be zero.

What we claim is:

1. A method for preparing an antistatic polyurethane foam comprising reacting polyol with polyisocyanate to form a polyurethane foam in the presence of about 0.05 to 10 parts by weight based on 100 parts by weight of the polyol of a quaternary ammonium salt as an antistatic agent selected from the group consisting of:

$[C_{12}H_{25}N(CH_3)_3]ClO_4$;
$[C_{12}H_{25}N(CH_3)_2C_2H_4OH]ClO_4$;

$[C_{12}H_{25}N(CH_3)_2C_2H_4OH]CH_3\text{-}\langle\text{C}_6\text{H}_4\rangle\text{-}SO_3$;

$[C_{12}H_{25}N(CH_3)_2C_2H_4OH]Br$;

$[C_{12}H_{25}N(CH_3)_2CH_2\text{-}\langle\text{C}_6\text{H}_5\rangle]Cl$;

$$\left[\begin{array}{c}C_{11}H_{23}-C\diagup^{N-CH_2}_{N-CH_2}\diagdown\\C_3H_6OH\quad(CH_2CH_2O)_5H\end{array}\right]Cl;$$

$$\left[\begin{array}{c}CH_3\\C_{16}H_{33}-N-CH_2-C_6H_5\\CH_3\end{array}\right]Cl;$$

$$\left[\begin{array}{c}CH_3\\C_{12}H_{25}-N-CH_3\\CH_3\end{array}\right]Cl;$$

$$\left[\begin{array}{c}CH_3\\C_{12}H_{25}-N-(CH_2CH_2O)_4H\\CH_3\end{array}\right]Cl;$$

and $$\left[\begin{array}{c}C_{12}H_{25}\diagdown\quad\diagup(CH_2CH_2O)_4H\\\quad N\\CH_3\diagup\quad\diagdown(CH_2CH_2O)_5H\end{array}\right]Br$$

and a mixture thereof.

2. A method for preparing an antistatic polyurethane foam which comprises impregnating polyurethane foam with a solution of antistatic agent and drying the impregnated foam leaving in the foam an effective amount of the antistatic agent wherein said antistatic agent is a quaternary ammonium salt selected from the group consisting of:

$[C_{12}H_{25}N(CH_3)_3]ClO_4$;
$[C_{12}H_{25}N(CH_3)_2C_2H_4OH]ClO_4$;

$[C_{12}H_{25}N(CH_3)_2C_2H_4OH]CH_3\text{-}\langle\text{C}_6\text{H}_4\rangle\text{-}SO_3$;

$[C_{12}H_{25}N(CH_3)_2C_2H_4OH]Br$;

$[C_{12}H_{25}N(CH_3)_2CH_2\text{-}\langle\text{C}_6\text{H}_5\rangle]Cl$;

$$\left[\begin{array}{c}C_{11}H_{23}-C\diagup^{N-CH_2}_{N-CH_2}\diagdown\\C_3H_6OH\quad(CH_2CH_2O)_5H\end{array}\right]Cl;$$

$$\left[\begin{array}{c}CH_3\\C_{16}H_{33}-N-CH_2-C_6H_5\\CH_3\end{array}\right]Cl;$$

$$\left[\begin{array}{c}CH_3\\C_{12}H_{25}-N-CH_3\\CH_3\end{array}\right]Cl;$$

$$\left[\begin{array}{c}CH_3\\C_{12}H_{25}-N-(CH_2CH_2O)_4H\\CH_3\end{array}\right]Cl;$$

and $$\left[\begin{array}{c}C_{12}H_{25}\diagdown\quad\diagup(CH_2CH_2O)_4H\\\quad N\\CH_3\diagup\quad\diagdown(CH_2CH_2O)_5H\end{array}\right]Br$$

and a mixture thereof.

3. An antistatic foam containing an effective amount of quaternary ammonium salt as antistatic agent prepared by reacting polyol with polyisocyanate in the presence of said salt, said salt being selected from the group consisting of:

[C$_{12}$H$_{25}$N(CH$_3$)$_3$]ClO$_4$;

[C$_{12}$H$_{25}$N(CH$_3$)$_2$C$_2$H$_4$OH]ClO$_4$;

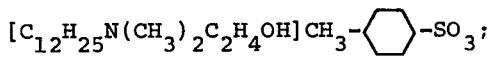

[C$_{12}$H$_{25}$N(CH$_3$)$_2$C$_2$H$_4$OH]Br;

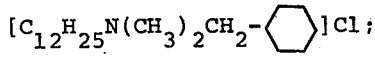

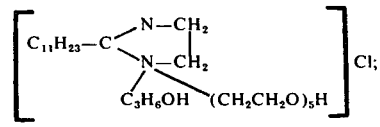

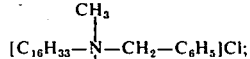

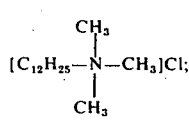

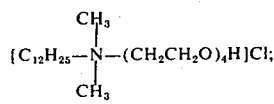

and

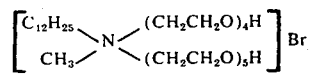

and a mixture thereof.

4. An antistatic polyurethane foam according to claim 3 in which said quaternary ammonium salt is added to prepared polyurethane foam by impregnating said foam with a solution of said salt and drying the impregnated foam.

5. An antistatic polyurethane foam according to claim 3 wherein said salt is present in said foam in an amount of about 0.05 to 10 parts by weight based on 100 parts by weight of polyol used in the formation of the foam.

* * * * *